United States Patent
Knittel et al.

(10) Patent No.: US 7,440,152 B2
(45) Date of Patent: Oct. 21, 2008

(54) HOLOGRAPHIC DISK MEDIUM WITH SERVO MARKS

(75) Inventors: Joachim Knittel, Tuttlingen (DE); Hartmut Richter, Villingen-Schwenningen (DE); Stephan Knappmann, Zimmern ob Rottweil (DE)

(73) Assignee: Thomson Licensing, Boulogne Billancourt (FR)

( * ) Notice: Subject to any disclaimer, the term of this patent is extended or adjusted under 35 U.S.C. 154(b) by 161 days.

(21) Appl. No.: 11/348,801

(22) Filed: Feb. 7, 2006

(65) Prior Publication Data
US 2006/0181999 A1 Aug. 17, 2006

(30) Foreign Application Priority Data
Feb. 11, 2005 (EP) .................................. 05101030

(51) Int. Cl.
*G03H 1/02* (2006.01)
*G11B 3/70* (2006.01)
*G11B 5/84* (2006.01)
*G11B 7/26* (2006.01)

(52) U.S. Cl. ......................................... 359/3; 369/279

(58) Field of Classification Search ..................... 359/1, 359/21, 22, 24, 32, 3; 369/103, 275.1, 275.3, 369/275.4, 279
See application file for complete search history.

(56) References Cited

U.S. PATENT DOCUMENTS

| 6,721,076 | B2 * | 4/2004 | King et al. ..................... 359/35 |
| 2004/0001400 | A1 | 1/2004 | Amble et al. |
| 2005/0002311 | A1 | 1/2005 | Ichihara et al. |
| 2006/0109774 | A1 * | 5/2006 | Horimai et al. .......... 369/275.1 |

FOREIGN PATENT DOCUMENTS
EP 1471507 A2 10/2004

OTHER PUBLICATIONS
Search Report, Aug. 4, 2005.
* cited by examiner

*Primary Examiner*—Alessandro Amari
(74) *Attorney, Agent, or Firm*—Joseph J. Laks; Robert B. Levy; J. Tony Villabon

(57) ABSTRACT

The present invention relates to a holographic disk medium (1) with servo marks (7), and more specifically to a holographic disk medium (1) having a common reflective layer (3) for reflecting a servo beam (9) and object and reference beams (8). According to the invention, a holographic disk medium (1) with a recording layer (2) for recording holograms (6) and a reflective layer (3) for reflecting a servo beam (9) and object and reference beams (8), includes servo marks (7) which are located in the reflective layer (3) at least partly below the holograms (6), wherein the servo marks (7) are designed such that their influence on the object and reference beams (8) is minimized.

11 Claims, 2 Drawing Sheets

HOLOGRAPHIC DISK MEDIUM WITH SERVO MARKS

This application claims the benefit, under 35 U.S.C. §119 of European Patent Application 05101030.4, filed Feb. 11, 2005.

FIELD OF THE INVENTION

The present invention relates to a holographic disk medium with servo marks, and more specifically to a holographic disk medium having a common reflective layer for reflecting a servo beam and object and reference beams.

BACKGROUND OF THE INVENTION

Holographic storage systems are preferably equipped with a servo system to accurately control the position of the optical read/write system relative to a storage medium, e.g. a holographic optical disk. Such a servo system usually makes use of servo marks such as pits located on the storage medium.

It has been proposed to use different laser wavelengths for a servo beam and the object and reference beams. In this case a recording material which is only sensitive to light of one specific wavelength is employed. Light with a different wavelength can then be used for servoing etc. The servo marks are separated from the recording material of the holographic disk medium by a dichroic layer. Such a prior art solution is depicted in FIG. 1. The holographic disk medium 1 includes a recording layer 2, in which the holograms 6 are recorded, a mirror layer 3 for reflecting the servo beam 9, a dichroic mirror layer 5 for reflecting the object and reference beams 8, and two buffer layers 4 for separating the other layers 2, 3, 5. Servo marks 7 are arranged in the mirror layer 3. In the example of FIG. 1, the object and reference beams 8 and the servo beam 9 are combined by a beam splitter 10 and focused into the holographic disk medium 1 by a focusing lens 11.

A further prior art concept, which is disclosed in EP 1471507, uses the same layer for reflecting the servo beam and the object and reference beams. In this way the dichroic layer is no more required, which makes the manufacturing of the holographic disk medium significantly easier. According to this solution the beams are laterally separated. A narrow track/groove or narrow pits are used for the generation of focus and track information. A wide mirror or land area between the tracks/grooves or pits is provided as a mirror located in the Fourier plane of the object and reference beams. A recording structure on a holographic disk medium in accordance with this solution is depicted in FIG. 2. A band 13 with servo marks 7 is arranged between each band 12 of holograms 6. The holograms do not overlap with the servo marks. No radial/lateral shift multiplexing is applied. Depending on the size of the holograms 6, i.e. the Fourier image, large beam separations are required. This leads to large aberrations of the servo beam, in particular in case of objective lenses with high numerical aperture (NA). In addition, only tangential shift multiplexing can be used.

A further prior art concept is disclosed in US 2005/002311. According to this concept, a hologram recording medium has a hologram layer and a servo layer. The tracks in the servo layer are located at least partly below the holograms. In order to minimize the influence of the servo marks on the object and reference beams the track width in the servo layer is either much larger or much smaller than the diameter of the object and reference beams.

SUMMARY OF THE INVENTION

It is an object of the invention to propose a holographic disk medium with one layer for reflecting the servo beam and the object and reference beams, which allows to employ both tangential and lateral/radial shift multiplexing.

According to the invention, this object is achieved by a holographic disk medium with a recording layer for recording holograms and a reflective layer for reflecting a servo beam and object and reference beams, wherein servo marks are located in the reflective layer at least partly below the holograms, and wherein the servo marks are designed such that their influence on the object and reference beams is minimized. The special arrangement and design of the servo marks has the advantage that it is not necessary to laterally separate the servo beam and the object and reference beams. This allows to use an identical light path for the servo beam and the object and reference beams (readout and recording beams), which simplifies the alignment of the laser beams. A further advantage is that besides tangential shift multiplexing also lateral/radial shift multiplexing can be realized. In addition, such a holographic disk medium is easy to manufacture. The required optical quality of the mirror layer for the object and reference beams is easy to control and can be manufactured by moulding of substrates from a dedicated stamper. Furthermore, neither a dichroic reflective layer nor an additional buffer layer with high flatness, small roughness, low thickness variation etc. is required. The reflective layer is the same for the servo beam and the object and reference beams and can be very similar to the reflective layer of a DVD-ROM.

Preferably, the servo beam has a first wavelength and the object and reference beams have a second wavelength, the servo marks having an effective depth of half the wavelength of the object and reference beams. Effective depth means that the actual depth is an odd integer multiple of half the wavelength of the object and reference beams. In this way for the object and reference beams the phase of the light reflected by a servo mark and the light reflected by the area around the servo mark add up coherently and the servo marks have no influence. Due to the wavelength difference, the effective depth of the servo marks will be different from half the wavelength of the servo beam. Therefore, the servo marks lead to a modulation of the reflected servo beam, which can be used for generating a servo signal.

Alternatively, the object and reference beams have a first direction of polarization and the servo beam has a second direction of polarization, the servo marks having a width and a depth adapted to minimize their influence on the object and reference beams. The interaction of small servo marks with a polarized light beam depends strongly on the direction of polarization. By varying the width of a servo marks for a given depth of the servo marks it is possible to minimize their influence on the object and reference beams having the first direction of polarization. At the same the influence on the perpendicular direction of polarization, and hence on the servo beam, can be maximized.

Advantageously, the holograms are aligned along a track. This simplifies the readout and/or recording operation. Preferably the holograms are arranged overlappingly by tangential and/or lateral/radial shift multiplexing. In this way higher storage densities are achieved.

Advantageously, the recording material of the recording layer does not change the optical properties of the object and reference beams. This applies especially to the direction of polarization of the beams, in order to keep the influence of the servo marks on these beams minimized.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERED EMBODIMENTS

Figure 1:
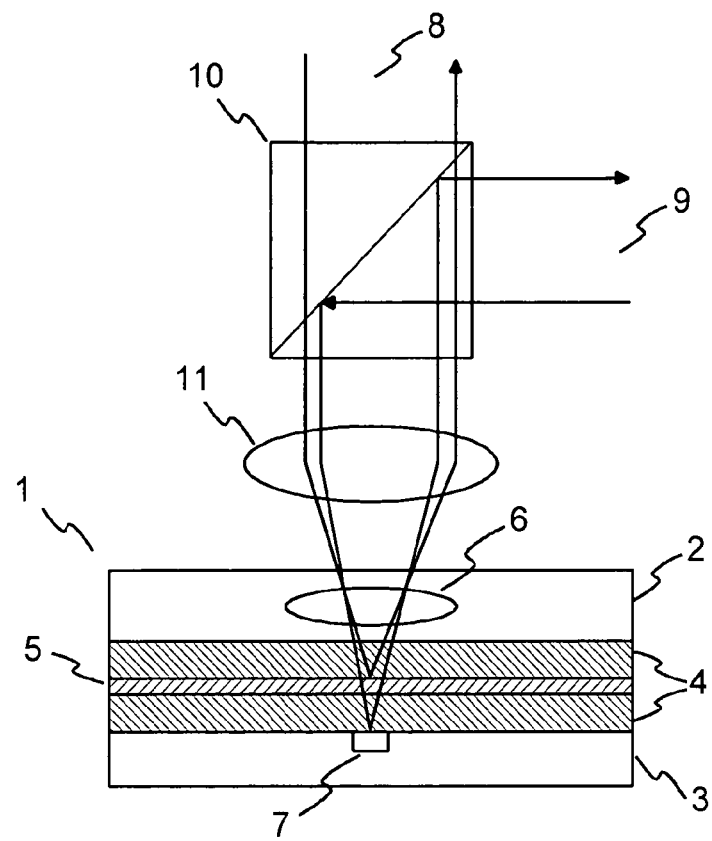
FIG. 1 depicts a holographic storage system according to a first prior art concept, FIG. 2 schematically shows a recording structure on a holographic disk medium according to a second prior art concept.
Figure 2:
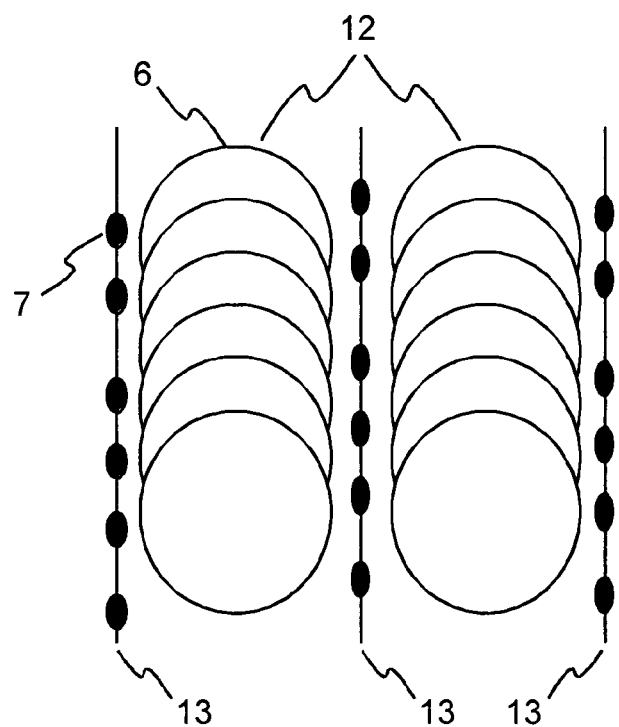
Figure 3:
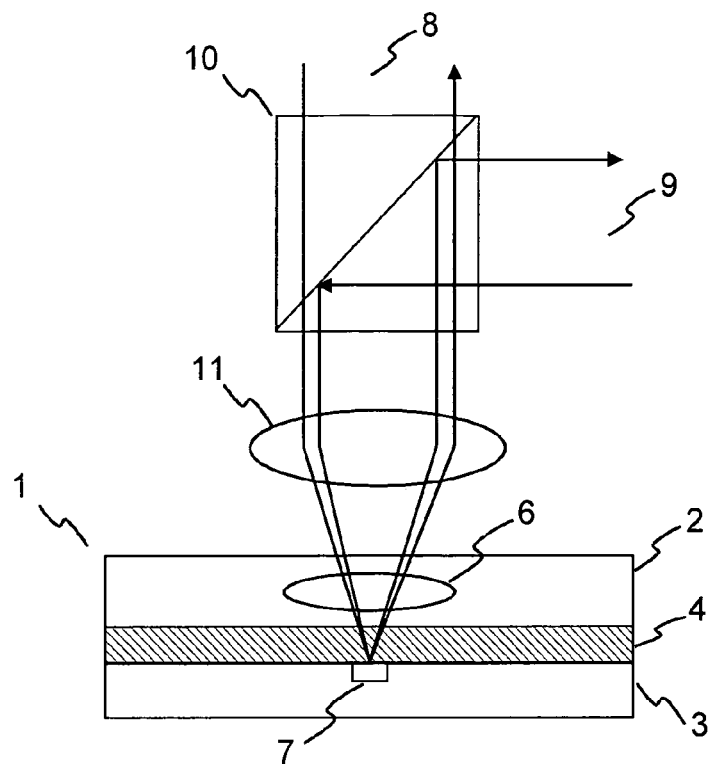
FIG. 3 depicts a holographic storage system using a holographic disk medium according to the invention, and FIG. 4 schematically shows a recording structure on a holographic disk medium according to the invention.

FIG. 3 depicts a holographic storage system using a holographic disk medium 1 according to the invention. The servo marks 7 (pits or groove) are integrated into the mirror layer 3 and lie directly below the hologram 6 separated by an optional buffer layer 4. Using a buffer layer 4 has the advantage that the holographic material of the recording layer 2 is not recorded in the focus of the focusing lens 11, where the intensity is high and a saturation could occur. However, it is likewise possible to omit the buffer layer 4. The object and reference beams 8 and the servo beam 9 use a similar optical path through the objective lens 11. The servo beam 9 is separated from the object and reference beams 8 by a dichroic beam splitter 10. As the object and reference beams 8 are reflected from the mirror layer 3, the servo marks 7 degrade the holographic write and read process. In order to minimize this degradation, the shape and in particular the depth of the servo marks 7 is chosen in such a way that the servo mark is essentially 'invisible' to the signal and reference beams 8. This can be achieved by using different wavelengths for the servo beam 9 and the object and reference beams 8. The servo marks 7 are designed in such a way that they have an effective depth of half the wavelength of the object and reference beams 8. This means that for the object and reference beams 8 the phase of the light reflected by a servo mark 7 and the light reflected by the area around the servo mark 7 add up coherently, and, therefore the servo marks 7 are invisible. Due to the wavelength difference, the effective depth of the servo marks 7 will be different from half the wavelength of the servo beam 9. Therefore, the servo marks 7 lead to a modulation of the reflected servo beam 9 and can be used for generating a servo signal.

Alternatively, the servo beam 9 and the object and reference beams 8 have different directions of polarization. The interaction of small servo marks 7, e.g. DVD ROM pits, with a polarized light beam depends strongly on the direction of polarization. By varying the width of a servo marks 7 for a given depth of the servo marks 7 it is possible to minimize their influence on the object and reference beams 8 having a first direction of polarization, whereas the influence for the perpendicular direction of polarization is maximized. In this case the dichroic beam splitter 10 is replaced by a polarizing beam splitter 10. Of course, it is likewise possible to combine both measures.

The servo marks 7 are located in a well-defined area below the holograms 6. Therefore, distortion caused by the structure of the servo marks 7 during readout of a hologram 6 is systematical and limited to certain Fourier components of the stored information. Though only a small degradation of the readout performance is to be expected, the knowledge of the well-known and systematical distortion caused by the servo marks 7 can be used to correct the readout path and, consequently, to improve the readout performance. Dedicated pre- and/or post-processing strategies can be applied to compensate for the systematic distortion, e.g. an amplification of the attenuated Fourier components.

Figure 4:
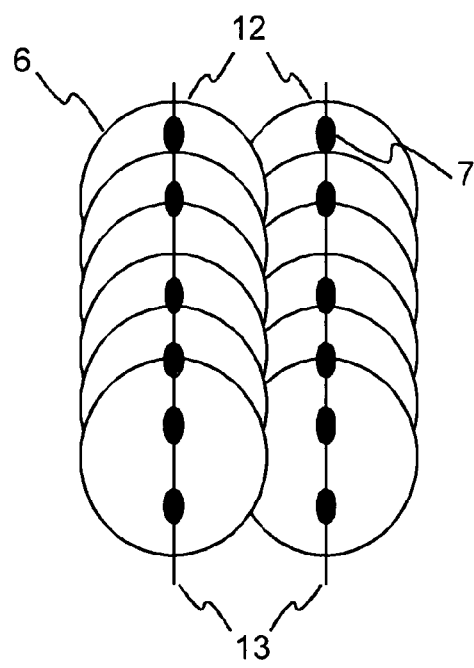

FIG. 4 schematically shows a recording structure on a holographic disk medium 1 according to the invention. The holograms 6 are aligned along a track 12 and may overlap. There is a single track 13, i.e. a row with servo marks 7, for each row 12 of overlapping holograms 6. The servo marks 7 are placed directly into the reflective layer 3 of the holographic disk medium 1. This makes the reflective layer 3 of the holographic disk medium 1 quite similar to e.g. a DVD ROM disk, if a red laser (650 nm) is used for the servo beam 9. The servo marks 7 are used for generating the servo signals, i.e. focusing and tracking error signals, and to obtain address information. In the Figure, longitudinal and radial/lateral shift multiplexing is realized.

What is claimed is:

1. Holographic disk medium with a recording layer for recording holograms and a reflective layer for reflecting a servo beam and for reflecting object and reference beams, the servo beam having a first wavelength and the object and reference beams having a second wavelength, the holographic disk medium comprising:

servo marks located in the reflective layer at least partly below the holograms such that the servo marks interact with the servo beam as well as with the object and reference beams, wherein the servo marks have an effective depth of half the wavelength of the object and reference beams such that the influence of the servo marks on the object and reference beams is minimized.

2. Holographic disk medium according to claim 1, wherein the width of the servo marks is further adapted to maximize their influence on the servo beam.

3. Holographic disk medium according to claim 1, wherein the holograms are aligned along a track.

4. Holographic disk medium according to claim 1, wherein the holograms are arranged overlapping by tangential and/or lateral/radial shift multiplexing.

5. Holographic disk medium according to claim 1, wherein the recording material of the recording layer does not change the optical properties of the object and reference beams.

6. Holographic disk medium with a recording layer for recording holograms and a reflective layer for reflecting a servo beam and for reflecting object and reference beams, the object and reference beams having a first direction of polarization and the servo beam having a second direction of polarization, the holographic disk medium comprising;

servo marks are located in the reflective layer at least partly below the holograms such that the servo marks interact with the servo beam as well as with the object and reference beams, wherein the servo marks have a width and a depth adapted to minimize the influence of the servo marks on the object and reference beams.

7. Holographic disk medium according to claim 6, wherein the width and the depth of the servo marks is further adapted to maximize their influence on the servo beam.

8. Holographic disk medium according to claim 6, wherein the second direction of polarization is perpendicular to the first direction of polarization.

9. Holographic disk medium according to claim 6, wherein the holograms are aligned along a track.

10. Holographic disk medium according to claim 6, wherein the holograms are arranged overlappingly by tangential and/or lateral/radial shift multiplexing.

11. Holographic disk medium according to claim 6, wherein the recording material of the recording layer does not change the optical properties of the object and reference beams.

* * * * *